United States Patent [19]

Chai et al.

[11] 4,029,977

[45] June 14, 1977

[54] ROTARY STEPPER MOTOR AND METHOD OF OPERATION

[75] Inventors: Hi Dong Chai, Binghamton; Joseph Paul Pawletko, Endwell, both of N.Y.

[73] Assignee: International Business Machines Corporation, Armonk, N.Y.

[22] Filed: Nov. 26, 1975

[21] Appl. No.: 635,535

[52] U.S. Cl. .............................. 310/49 R; 318/696; 318/138
[51] Int. Cl.² ...................................... H02K 37/00
[58] Field of Search ................. 318/696, 685, 138; 310/49

[56] References Cited

UNITED STATES PATENTS 3,509,392  4/1970  Snowden .................... 310/49 R
3,535,604  10/1970  Madsen et al. ................ 310/49 R
3,866,104  2/1975  Heine ........................ 310/49 R

*Primary Examiner*—Herman J. Hohauser
*Attorney, Agent, or Firm*—John S. Gasper

[57] ABSTRACT

A three phase rotary stepper motor of the variable reluctance type comprises a rotor and an annular stator having three pairs of diametrically opposed stator poles wound with bifilar windings. The stator windings are connected so that opposed poles are energized as a pair having the same polarity. The bifilar winding is connected so that pole pairs are energized with either polarity. A two phase energization scheme is used which causes adjacent poles of two pole pairs to have opposite polarity, while the third pole pair is magnetically neutral. Every three steps of the sequence the magnetically neutral pole pair is magnetized with the reverse polarity.

7 Claims, 9 Drawing Figures

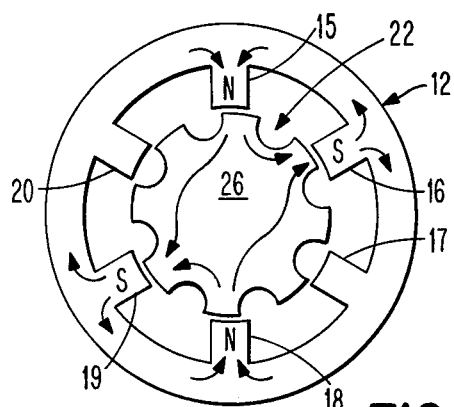
FIG. 6
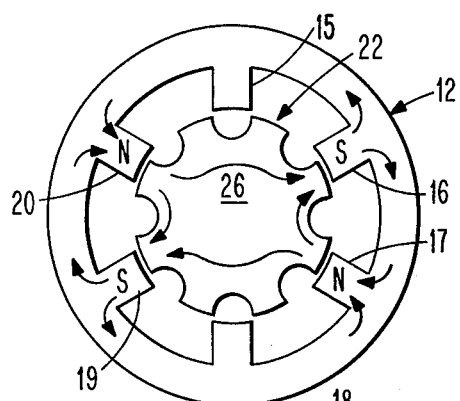
FIG. 7
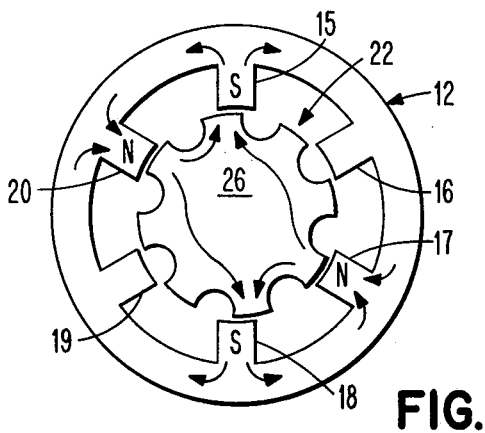
FIG. 8
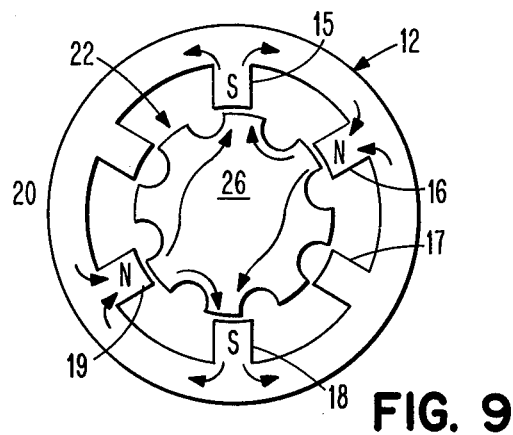
FIG. 9
| STEP | SWITCHES (CLOCKWISE) | ENERGIZED WINDINGS | POLARITY POLES | | | | | |
|---|---|---|---|---|---|---|---|---|
| | | | 15 | 16 | 17 | 18 | 19 | 20 |
| 1 | 34, 33 | 15a — 18a , 10b — 19b | N | S | X | N | S | X |
| 2 | 37, 33 | 17a — 20a, 16b — 19b | X | S | N | X | S | N |
| 3 | 37, 35 | 17a — 20a, 15b — 18b | S | X | N | S | X | N |
| 4 | 35, 32 | 15b — 18b , 16a — 19a | S | N | X | S | N | X |
| 5 | 32, 36 | 16a — 19a , 19b — 20b | X | N | S | X | N | S |
| 6 | 36, 34 | 17b — 20b, 15a — 18a | N | X | S | N | X | S |
| 7 | 34, 33 | 15a — 18a , 16b — 19b | N | S | X | N | S | X |
FIG. 5

ROTARY STEPPER MOTOR AND METHOD OF OPERATION

BACKGROUND OF THE INVENTION

1. Field of the Invention

This invention relates to stepper motors and particularly to rotary stepper motors of the variable reluctance (also called synchronous inductor) type and a method of operation therefor.

2. Description of the Prior Art

The rotary variable reluctance stepper motor of the type to which the present invention is related involves a stator having plural poles, inductive windings on the stator poles, and a cylindrical rotor of magnetic material whose rotation is controlled by the rate of change in the sequence of energization of the windings. A characteristic of this type motor is that the pole faces adjacent the rotor and the rotor surface are provided with teeth. To cause the rotor to rotate with a steplike manner, the pitch to the rotor teeth differs by a predetermined ratio from the pitch of the stator teeth.

For many applications of the stepper motor it is desirable or essential that the motor be rotated in increments or steps of precisely uniform amounts. This has not always been achieved with the desired degree of success since the dynamic response for any given step was not always optimum. Various structures and techniques for energizing the windings have been devised. Examples of such techniques are shown in U.S. Pat. No. 3,535,604, issued to Elmer W. Madsen and Hermann Rosshirt on Oct. 20, 1970, titled "Electric Stepping Motor", and 3,509,392, issued to Arthur E. Snowden on Apr. 28, 1970, titled "Variable Reluctance Electric Stepping Motor with Field Energizing Circuitry" and prior art cited therein.

Heretofore as discussed in the above-mentioned Madsen and Snowden patents, it was taught that exact step operation in a variable reluctance motor required a magnetic structure and energization arrangement in which the individual poles would always be magnetized with the same polarity. Among other things this approach to the problem of uniform incrementing of the motor required a relatively large number of poles, particularly where polyphase energization is desired. For example, for two-phase energization a four phase eight pole motor is required. This made the motors relatively large in size thereby increasing the amount of energy needed to drive them. At the same time, the amount of torque obtainable was not high enough.

SUMMARY OF THE INVENTION

It is a general object of this invention to provide an improved stepper motor, particularly of the variable reluctance type.

It is a specific object of this invention to provide an improved variable reluctance stepper motor and method of operation therefor in which the torque speed characteristics have been improved.

It is a still further object of this invention to provide a stepping motor which is resistant to resonating, has a low inertia rotor so as to have a relatively high stepping speed and has a high torque capability without using a permanent magnet rotor.

Basically, the invention for achieving the above as well as other objects provides a three phase variable reluctance motor which is energized in a two phase manner. Specifically, the motor comprises a stator having three pairs of uniformly spaced, diametrically opposed poles and a cylindrical rotor. The faces of the poles and the periphery of the rotor have equally spaced teeth separated by a uniform air gap. The pitch of the teeth on the rotor and on the stator is identical. The stator poles are displaced so that in the detent position all teeth of one pole pair are aligned with rotor teeth while all other teeth are equally misaligned. Each stator pole is provided with dual inductive windings preferably of the bifilar type. The windings are electrically connected such that each winding, when energized, co-acts with the corresponding winding on the diametrically opposed pole of the pole pair to cause the pole pair to be magnetized with the same polarity.

The energization is performed in a manner to cause two pole pairs of the three phase motor to be magnetized concurrently such that adjacent poles have opposite polarity while the opposite poles have the same polarity. The windings on the third pole pair are not energized. For that reason, a neutral magnetic plane exists which passes through the third pole pair. In each successive step then the neutral pole pair is magnetized so that its polarity is then opposite the second pole pair and the first pole pair is de-energized to become magnetically neutral. In the next step of the sequence of operations the second pole pair is de-energized to become neutral while the first pole pair is magnetized but in the opposite sense so that the adjacent poles have opposite polarity. The sequence is repeated until the original energization occurs. Thus, in accordance with this sequence of operations, the poles are magnetized in a reverse direction every three step sequence, but the magnetization reversal is always preceded by a step in which the pole pair is in the magnetically neutral state. Because of this very precise stepping is achieved between all steps. Also, greatly increased torque over a wide range of speeds is obtainable.

The foregoing and other objects, features and advantages of the invention will be apparent from the following more particular description of a preferred embodiment of the invention, as illustrated in the accompanying drawing.

BRIEF DESCRIPTION OF THE DRAWING

FIG. 5 is a sequence chart showing the sequence for energizing the windings in accordance with the arrangement shown in FIG. 3; and FIGS. 6 – 9 show the flux distribution in the motor for several of the steps of the sequence illustrated in FIG. 5.

DETAILED DESCRIPTION OF THE INVENTION

Figure 1:
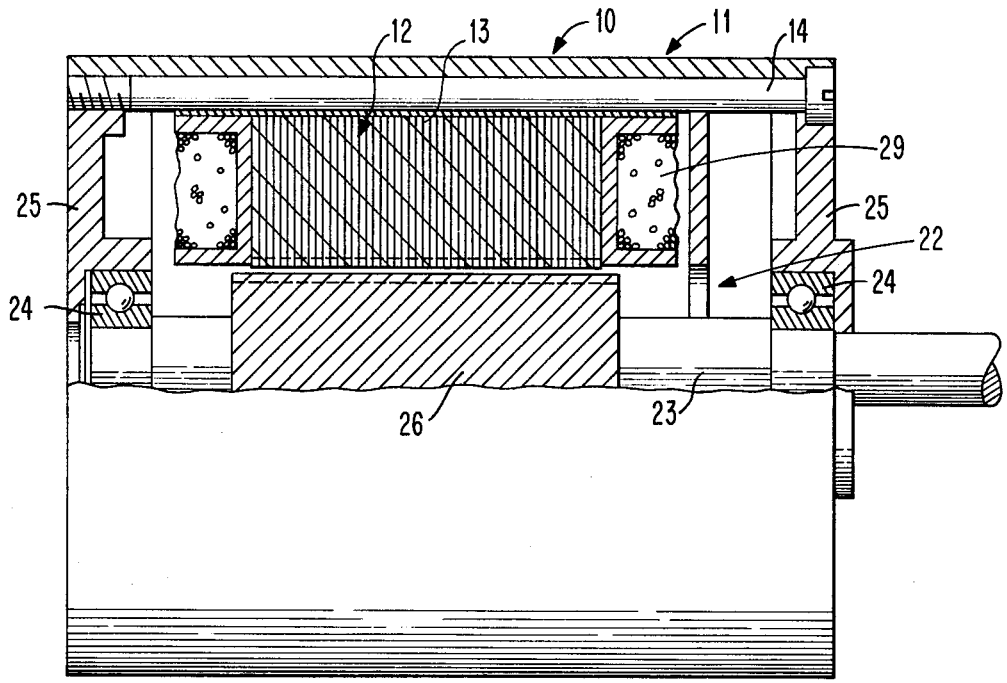
FIG. 1 is a side view of a motor shown partly in axial section.
Figure 2:
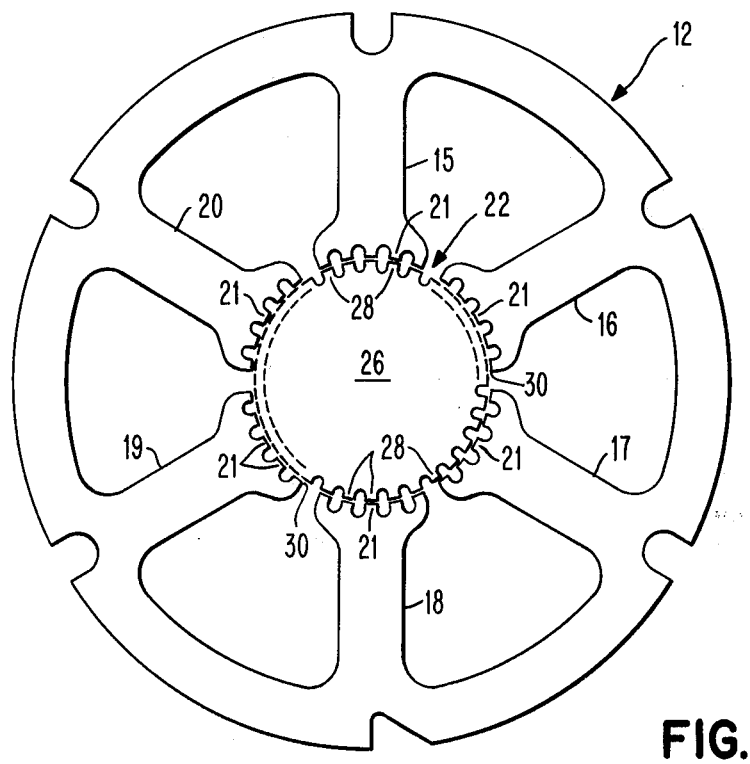
FIG. 2 is an end view of the rotor and stator with certain elements of structure omitted to illustrate the arrangement of the teeth of the motor.

Referring to FIG. 1, motor 10 of the present invention includes a housing 11. Within the housing there is a stator 12 formed of thin laminations 13 of permeable iron or the like secured together and supported in suitable means such as by bolts 14. As seen in FIG. 2, the laminations 13 are each identical and formed to provide plural inwardly projecting poles 15 – 20. Each pole 15 – 20 has an arcuate pole face that is formed with equally spaced teeth 21 that extend inwardly and axially. A dual or bifilar winding 29 is provided on each pole 15 – 20 for effecting the magnetization thereof with either north or south polarities dependent on the energization thereof, as will be explained hereinafter.

A rotor 22 comprising shaft 23 is supported by bearings 24 in the ends 25 of housing 11. Rotor 22 has a central portion 26 comprised of plural laminations attached to the shaft 23 so as to be rotatable therewith. The periphery of the central portion 26 is formed with radial outwardly extending and axially elongate rotor teeth 28. The central portion 26 is substantially coextensive with the stator poles 15 – 20 and designed to rotate within the stator 12 with the rotor teeth 28 separated from the stator teeth by a uniform air gap 30.

The rotor teeth 28 are equally spaced around the periphery. The pitch of the rotor teeth 28 and the stator teeth 21 are identical. The stator poles 15 – 20 are displaced so that in the detent position all the teeth 21 of one pole pair are aligned with rotor teeth 28 while all other stator teeth 21 and rotor teeth 28 are misaligned. This can be obtained in various ways. One well-known way is to have the pitch of the teeth on the poles the same as the pitch of the rotor teeth, but the poles 15 – 20 are displaced a fraction of a tooth pitch.

As previously mentioned, each of the poles 15 – 20 is provided with a dual or bifilar inductive winding. The manner and structure of making and mounting bifilar windings is well-known. The specific arrangement of the windings on the stator and their electrical connections is illustrated for bifilar windings in FIG. 3. There the windings are arranged geometrically in the same manner as the stator poles 15 – 20, as illustrated in FIG. 2. Thus, pole 15 has windings 15a and 15b, pole 16 has windings 16a and 16b and pole 17 has windings 17a and 17b. Likewise, poles 18, 19 and 20 have the bifilar windings 18a, 18b, 19a, 19b, 20a and 20b, respectively. All the windings having subscript a are connected in series with the counterpart winding on the opposite pole. Likewise, the windings with the subscript b are similarly series connected to the counterpart bifilar winding on the diametrically opposed pole. As illustrated, the a windings produce north polarity magnetization while the b windings produce south polarity magnetization of the poles.

Figure 3:
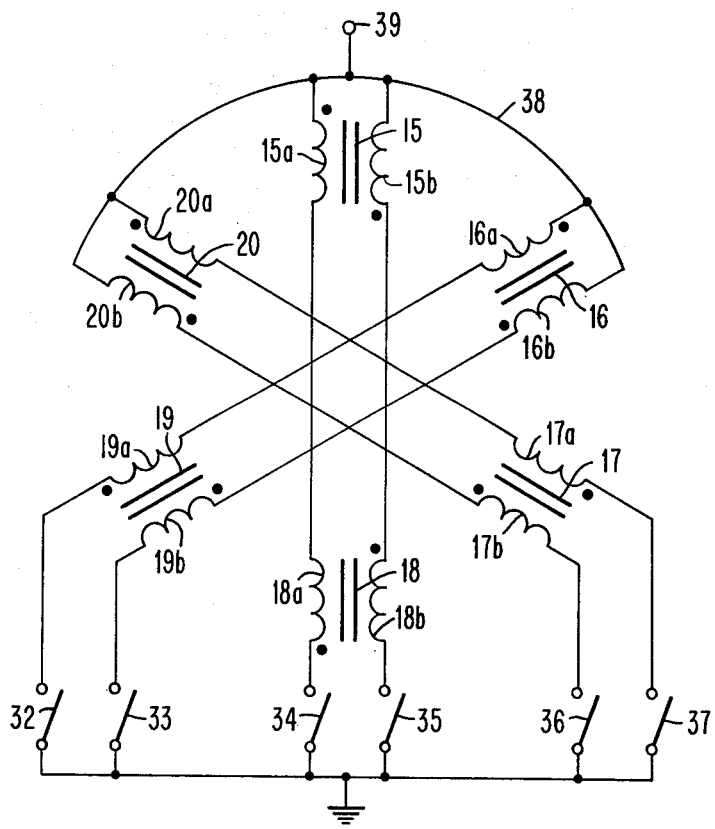
FIG. 3 is a schematic showing the stator windings and their interconnections into an energizing circuit.

For the purpose of description, poles 15 – 18, 16 – 19 and 17 – 20 form diametrically opposed pole pairs. In accordance with this invention, the pole pairs are magnetized to have the same polarity. The circuits connections for achieving this are shown in FIG. 3. As shown in that figure, the subscript a windings are connected together in series through switches 32, 34 and 37, while the b subscript windings are connected through switches 33, 35 and 36 to a ground terminal. The other ends of all the windings 15a through 20b are connected in a suitable manner through a common lead connection 38 to a terminal 39 which is connected to a d-c voltage source. While the switches 32 – 37 are schematically shown as manual switches, it is understood that they can be automatic switching circuits operable to perform switching operations in the sequences to be used in accordance with this invention.

As previously mentioned, each pole pair is magnetized to have the same polarity. Thus, poles 15 – 20 are magnetized to have N polarity when switches 32, 34 and 37 are closed to energize the windings 15a and 18a, 16a and 19a, and 17a and 20a, respectively. Likewise, poles 15 – 20 are magnetized with S polarity when switches 33, 35 and 36 are closed.

The detailed sequence for magnetizing the stator poles 15 – 20 in accordance with the invention is shown in FIG. 5. In step 1 switches 34 and 33 are closed. This supplies current to the windings 15a and 18a to magnetize the first pole pair (15 and 18) with N polarity and current to windings 16b and 19b to magnetize the second pole pair (16 and 19) with S polarity. Thus, opposite poles 15 and 18 and 16 and 19 are of the same polarity, while adjacent poles 15, 16 and 18, 19 of the magnetized two pole pairs have opposite polarities. At the same time switches 36 and 37 being open no current is applied to windings 17a and 17b or 20a and 20b so that the third pole pair (19 and 20) received no magnetization current and in fact, due to its position of symmetry between oppositely magnetized adjacent pole pairs is rendered completely magnetically neutral. In step 2 switch 34 is opened and switch 37 is closed while switch 33 remains closed. Thus, the polarity of the pair of poles 16 and 19 remains while the previously neutral pole pair (17 and 20) becomes magnetized by current in windings 17a and 20a with N polarity and the previously magnetized N pole pair (15 and 18) is demagnetized to become magnetically neutral. In step 3 switch 37 remains closed, switch 33 is opened and switch 35 is closed. In step 3 windings 17a and 20a continue to be energized to magnetize poles 17 and 20 with N polarity. Poles 15 and 18, however, which were previously neutral and magnetized with N polarity in the initial step now have a polarity reversed to S polarity. With switches 32 and 33 opened, poles 16 and 19 become magnetically neutral. The sequence is completed as shown in FIG. 5 with the polarity shown. It should also be noted in connection with the described switching sequence that polarity reversal does occur; however, polarity reversal is always preceded by a demagnetization to the magnetically neutral state in the immediately preceding step. This reduces the amount of energy required to drive the motor and improves the stepping characteristic of the motor and permits switching at relatively high speeds.

The concept of magnetically neutral poles is more fully understood by reference to FIGS. 6 – 9. FIG. 6 shows the magnetic state of central portions 26 of rotor 22 and stator 12 for step 1 of FIG. 5, i.e. when switches 34 and 33 are closed. Poles 15 and 18 have N polarity and poles 16 and 19 have S polarity. The basic flux path is a closed loop from pole 15 through central portion 26 of rotor 22 to pole 16 back to pole 15. Likewise, the flux path is a closed loop from pole 18 through portion 26 of rotor 22 to pole 19 and back to pole 18. Superimposed on this is a flux path from pole 18 to pole 16 and back through the central portion 26 of rotor 22. A similar flux path exists from pole 15 to pole 19 and back through stator 12. Because poles 17 and 20 are located equidistantly between N and S poles, any flux from the adjacent poles tends to cancel each other thereby neutralizing the poles 17 an 20. Thus, all the flux which produces detenting action occurs between the energized poles and the unenergized pole produces no flux interaction which might affect the detenting action of the energized poles thereby reducing the degree of resonance that could occur in the stepper motor.

It should also be observed in FIGS. 6 – 9 that the flux path generation for each pair of steps remains the same. This is due to the fact that every other step in the operation causes a reversal in the polarity of the pole pairs. Because of this, the sequence in the flux pattern is repeated without any discontinuity. While FIGS. 6 – 9 show only four steps of the sequence, it would be readily apparent how the flux distribution would occur for steps of 5 and 6.

Figure 4:
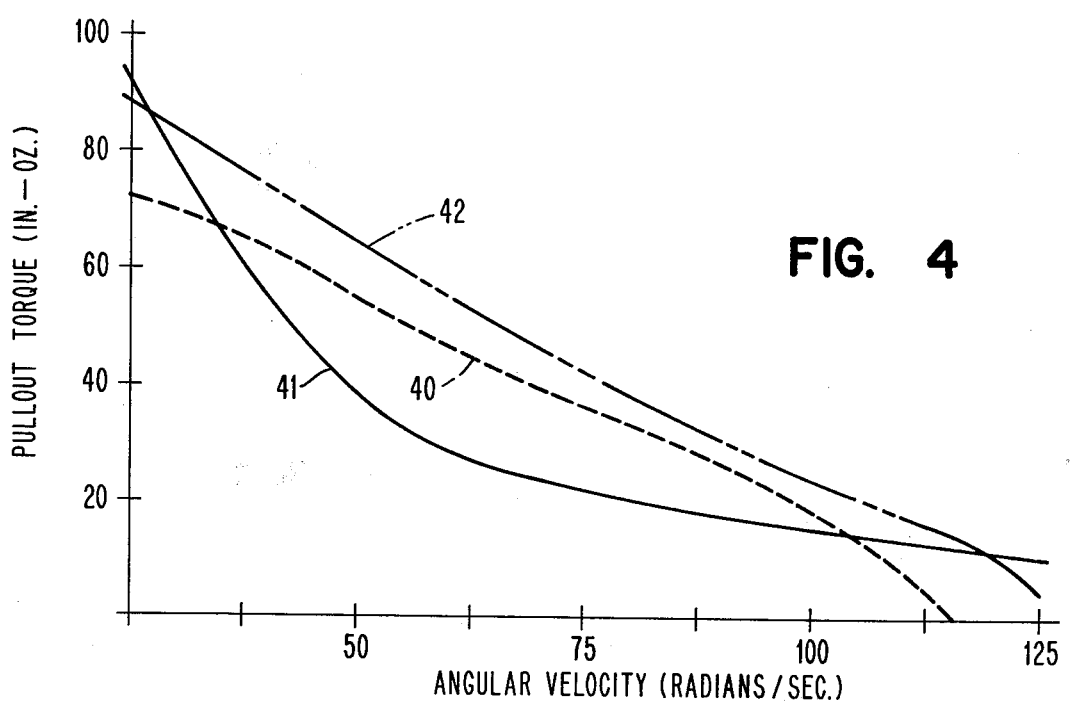
FIG. 4 is a chart showing speed torque characteristics of various types of stepping motors.

With the above arrangement and sequence of operations a stepper motor operation has been produced which greatly increases the speed torque characteristic while reducing the size of the motor without increasing the amount of energy required and which produces improved detenting and a reduction in resonance. With reduced size the stepper motor inertia is greatly reduced thereby increasing stepping speed capability. FIG. 4 shows torque-velocity characteristics of a variable reluctance motor operated in accordance with this invention and compared to two other known type stepper motors. Curve 40 illustrates the torque speed characteristic of a permanent magnet stepper motor using four phase energization. Curve 41 illustrates the performance characteristic of a four phase variable reluctance motor using the principle of always magnetizing the poles in the same polarity. Curve 42 shows the performance characteristic of the three phase stepper motor of the variable reluctance type using the two phase energization sequence already described. As shown by curve 40 the four phase variable reluctance motor has initial high torque which rapidly decreases with increasing velocity. As seen from curve 41 the permanent magnet four phase stepper motor has somewhat lower initial torque which decreases at a linear rate with increased velocity. As shown by curve 42 the three phase variable reluctance stepper motor operated in accordance with this invention has an initial torque in the range of the four phase motor but maintains the torque at a much higher level than the four phase variable reluctance motor and the four phase permanent magnet motor throughout much of its range. With the windings energized as described the motor 10 develops higher torque than the four phase motor for the same ampere turn value. The three phase motor of this invention develops $\sqrt{3}$ times more torque with two phases energized vs. $\sqrt{2}$ times for the four phase version. Combining both factors just stated a three phase motor can develop 1.5 times the torque over a four phase design. Thus, it will be seen that the stepper motor of this invention provides an improved operating result which has widespread application where stepper motors are used.

While the invention has been particularly shown and described with reference to a preferred embodiment thereof, it will be understood by those skilled in the art that various changes in form and details may be made therein without departing from the spirit and scope of the invention.

We claim:

1. In a three-phase rotary stepper motor of the variable reluctance type comprising:
    an annular stator having three pairs of uniformly spaced, diametrically opposed, inwardly extending poles with the pole faces thereof having equally spaced teeth;
    a cylindrical rotor having a periphery with equally spaced teeth separated from said pole faces by a uniform air gap,
    said rotor teeth and said stator teeth being disposed to limit occurrence of exact alignment to predetermined teeth while causing misalignment of all the other teeth;

the method of operating said motor comprising:
    magnetizing said stator poles in a sequence of successive steps such that in each step
        first and second adjacent pole pairs are concurrently magnetized with adjacent poles having opposite polarity and diametrically opposed poles having the same polarity,
        said magnetized first and second pole pairs being separated by a magnetically neutral third pole pair, and
        then magnetizing the neutral third pole pair concurrently with and to have a polarity opposite from the adjacent second pole pair while causing the first pole pair ot become magnetically neutral.

2. In a three phase rotary motor of the variable reluctance type, the method in accordance with claim 1 which further comprises:
    magnetizing each pole pair with a reverse polarity every three steps in said sequence.

3. In a three phase rotary motor of the variable reluctance type, the method in accordance with claim 2 in which
    said magnetizing of each pole pair with a reverse polarity always occurs after said pole pair is caused to be magnetically neutral.

4. A three phase rotary stepper motor of the variable reluctance type comprising:
    an annular stator having three pairs of uniformly spaced, diametrically opposed, inwardly extending poles with the pole faces thereof having equally spaced teeth;
    a cylindrical rotor having a periphery with equally spaced teeth separated from said pole faces by a uniform air gap,
    said rotor teeth and said stator teeth being disposed to limit occurrence of exact alignment to predetermined teeth while causing misalignment of all other teeth; and
    means for magnetizing said stator poles in a sequence of successive steps such that in each step
        first and second adjacent pole pairs are concurrently magnetized with the adjacent poles having opposite polarity and diametrically opposed poles having the same polarity while said third pole pair is maintained magnetically neutral, and
        said third pole pair is then magnetized concurrently with and to have a polarity opposite from the adjacent second pole pair while causing the first pole pair to become magnetically neutral.

5. A three phase rotary stepper motor of the variable reluctance type in accordance with claim 4 in which
    said means for magnetizing said stator poles includes means for magnetizing each pole pair with a reverse polarity every three steps in said sequence.

6. A three phase rotary stepper motor of the variable reluctance type in accordance with claim 5 in which
    said means for magnetizing said stator poles includes means for magnetizing each pole pair with a reverse polarity after said pole pair is caused to be magnetically neutral.

7. A three phase rotary stepper motor of the variable reluctance type in accordance with claim 6 in which
    said annular stator includes bifilar windings on each of said stator poles,
    said bifilar windings of each pole pair being connected in series so as to cause each pole pair to be magnetized with the same polarity.

* * * * *